United States Patent Office 3,247,923
Patented Apr. 26, 1966

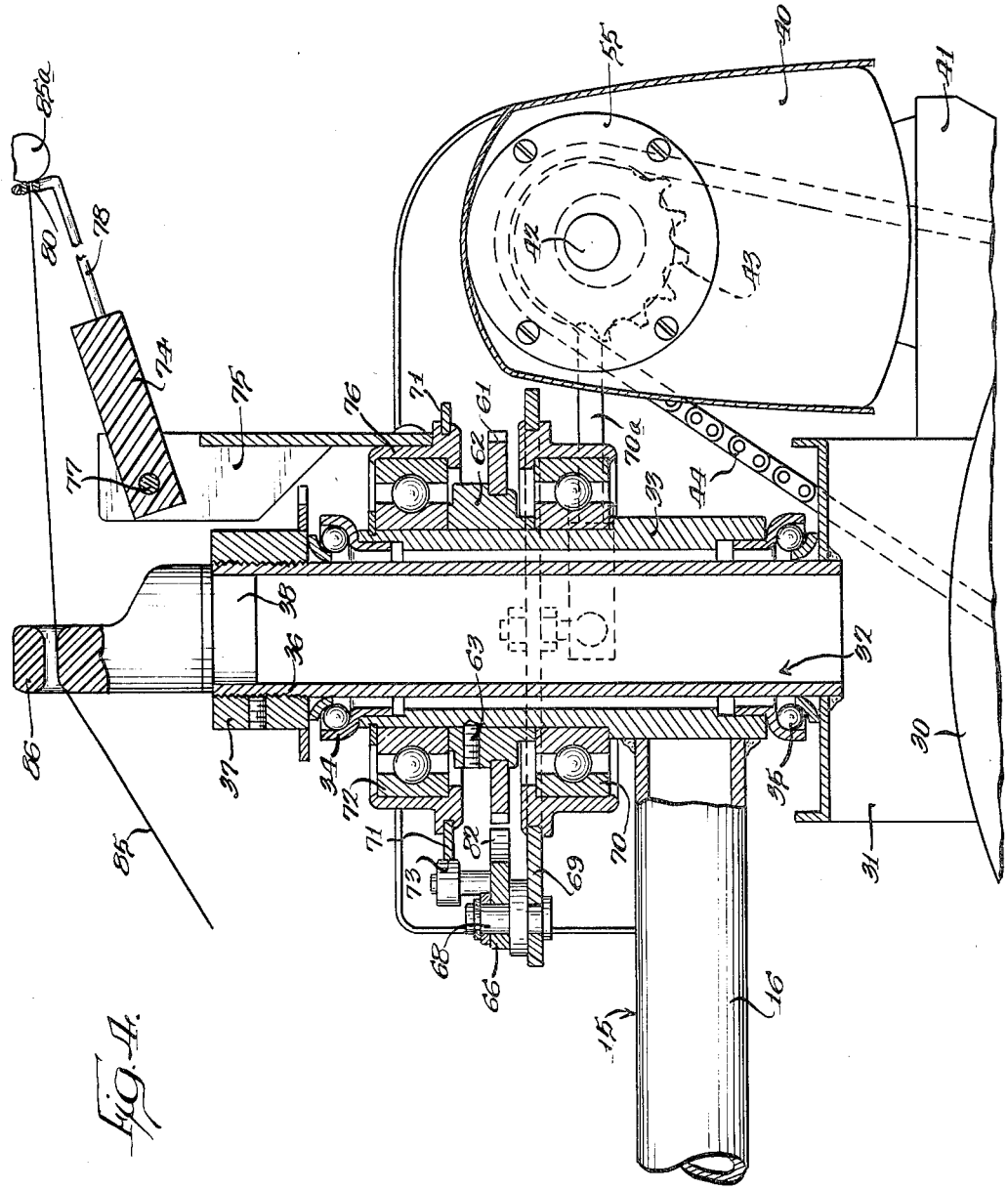

3,247,923
MOTORIZED GOLF CART
William D. Cornell, Grand Haven, Mich., assignor to Brunswick Corporation, a corporation of Delaware
Filed Apr. 10, 1963, Ser. No. 271,964
18 Claims. (Cl. 180—19)

This invention relates to a vehicle, and more particularly to a golf cart and components thereof.

The primary object of this invention is to provide a new and useful vehicle, and components thereof.

Numerous different types of golf carts for conveying a golf bag of clubs are available on the market. Some of these carts have self-propelling and guiding means which may be controlled by the golfer as he strolls along a fairway at some distance from the cart. Such carts are generally inconvenient to maneuver manually, and are often bulky and heavy so that they cannot be easily moved up and down steps or transported in the golfer's automobile and thus either rented on the course or, if owned by the golfer, are usually stored at a favorite course.

An important object of this invention is to provide a new and useful power operated golf cart which is both practical and durable in safely conveying a golf bag and clubs, and which may be manually handled with relative ease.

Another object is provision of a new and useful self-propelled golf cart controlled by a flexible line held by the golfer as he walks along the course.

Still another object is provision of a new and useful golf cart provided with a practical power steering mechanism.

A further object is provision of a new and useful golf cart provided with a practical guiding mechanism controlled by a flexible line.

Still a further object is provision of a new and useful golf cart which may be alternatively power operated or manually handled.

Another object is provision of a new and useful golf cart having a carriage which may be collapsed to a compact handling and storing position and expanded to an operative position. A related object is provision of a new and useful bag holder mounted on the chassis for weighting driving gear when the cart is self-propelled, and for counter-balancing the weight of the chassis when the cart is manually handled.

A further object is provision of a new and useful golf cart having a bag holder for effectively protecting a golf bag and clubs. A related object is provision of such a bag holder releasably mounted on a chassis and sufficiently compact and light for easy handling of the holder and golf bag when removed from the chassis.

Another important object is provision of a new and useful self-propelled golf cart having drive means associated with a chassis so as to provide optimum weighting of traction wheels.

A still further object is provision a new and useful power steering mechanism.

Other objects and advantages of the invention will become readily apparent from the following detailed description taken in connection with the accompanying drawings, in which:

FIG. 4 is a fragmentary sectional view taken generally along the line 3—3 of FIG. 4; and FIG. 5 is a wiring diagram.

Figure 1:
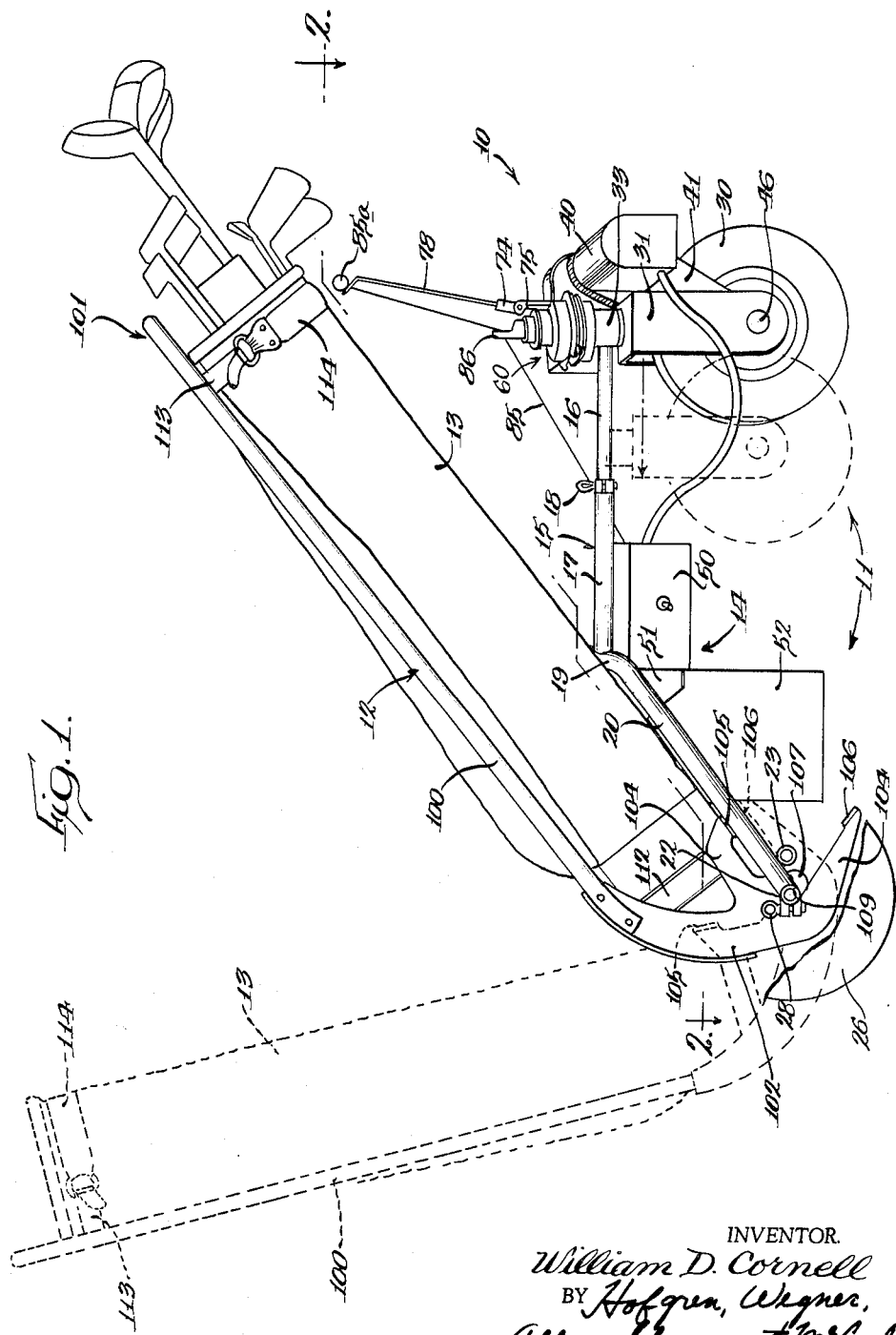
FIG. 1 is a side view of a preferred embodiment of the invention in the form of a golf cart.

While an illustrative embodiment of the invention is shown in the drawings and will be described in detail herein, the invention is susceptible of embodiment in many different forms, and it should be understood that the present disclosure is to be considered as an exemplification of the principles of the invention and is not intended to limit the invention to the embodiment illustrated. The scope of the invention will be pointed out in the appended claims.

The invention is, in brief, directed to a golf cart, and more particularly to a golf cart which may be conveniently manually handled or power operated through a self-propelling and guiding mechanism. The cart includes a collapsible chassis detachably mounting a golf bag holder movable between a position overlying the chassis and weighting the chassis for self-propelled operation, and a position extending outwardly from the chassis to facilitate manual handling of the cart.

Referring to the drawings, the golf cart includes a carriage 10 having a tricycle chassis 11 carrying a golf bag holder 12 to which is detachably secured a golf bag 13. In the illustrated embodiment, the chassis includes a collapsible frame 14 having a horizontal member 15 including a forward part 16 telescopically received in a rearward part 17 and releasably held in adjusted position by suitable holding means such as a bolt 18. A rear wheel support includes a U-shaped member 19 which has a mid-portion of its bight firmly secured to the rear end of horizontal member 15, in any suitable manner as by welding, with opposed legs 20 and 21 inclined downwardly and rearwardly from the bight and carrying at their free ends generally parallel horizontal tubes 22 and 23 firmly secured thereto in any suitable manner as by welding. Tubes 22 and 23 telescopically receive axles 24 and 25, respectively, rotatably carrying rear wheels 26 and 27, respectively. Axles 24 and 25 are retained in desired adjusted position by suitable means such as split ring clamps and locking eye bolts, as 28 and 29, carried on the ends of tubes 22 and 23, respectively. Thus, the width of the rear wheel tread may be varied as desired, and the wheels adjusted against legs 20 and 21 along with collapse of horizontal member 14 for transporting or storing in a car or the like.

A front propelling and guide wheel 30 is carried by a suitable mount such as a fork 31 pivotally mounted in and depending from a journal 32 including a generally vertical tube 33 firmly secured as by welding to the front end of horizontal frame member 15 and having upper and lower bearings 34 and 35, respectively, pivotally carrying a stem 36 of fork 31 and secured in the journal by a nut 37 adjustably threaded on the upper end of the stem. The upper end of stem 36 may be closed by a plug 38.

Means for propelling the cart in a forward direction is provided in the illustrated embodiment by an electric motor 40 suitably mounted on a bracket 41 rigidly carried by fork 31 and having a drive shaft 42 fixedly secured to a sprocket wheel 43 which receives a drive chain 44 from a sprocket wheel 45 outside of fork 31 and fixedly secured to an axle 46 journalled in opposed legs of fork 31. Axle 46 is fixedly secured to wheel 30 so that sprocket 45 drives wheel 30. Motor 40 is connected with a suitable power supply by a suitable control means, to be described hereinafter, in a control box 50 mounted on frame 14 below horizontal frame member 15 adjacent its rear end. The power supply includes a battery 51 mounted in a generally rectangular carrier 52 firmly and detachably secured to rear legs 20 and 21 in any suitable manner as by bolts 53.

In order to prevent movement of the cart, a normally applied brake 55 is mounted on bracket 41 and an end of motor shaft 42 opposite sprocket wheel 43 and is electrically released by energization through the control means.

Brake 55 may be of any suitable conventional type, such as a magnetic or solenoid control brake which is de-energized to brake motor shaft 42 and resist runaway on downhill grades.

Power steering means is provided for guiding the cart across the ground, and herein this means includes a pawl and ratchet mechanism 60 having a ratchet wheel 61 carried by a sleeve 62 telescoped on journal tube 33 and adjustably fixed in place thereon as by set screw 63. A pair of opposed pawls 66 and 67 are pivotally mounted, as by pivot pin 68, on an oscillating carrier 69. Carrier 69 is mounted on a suitable bearing, as 70, on journal tube 33, for free pivotal movement about the upright axis of fork 31, and is pivotally connected with an arm 70a eccentrically connected with motor shaft 42 so that carrier 69 is oscillating whenever motor 40 is in operation.

Figure 3:
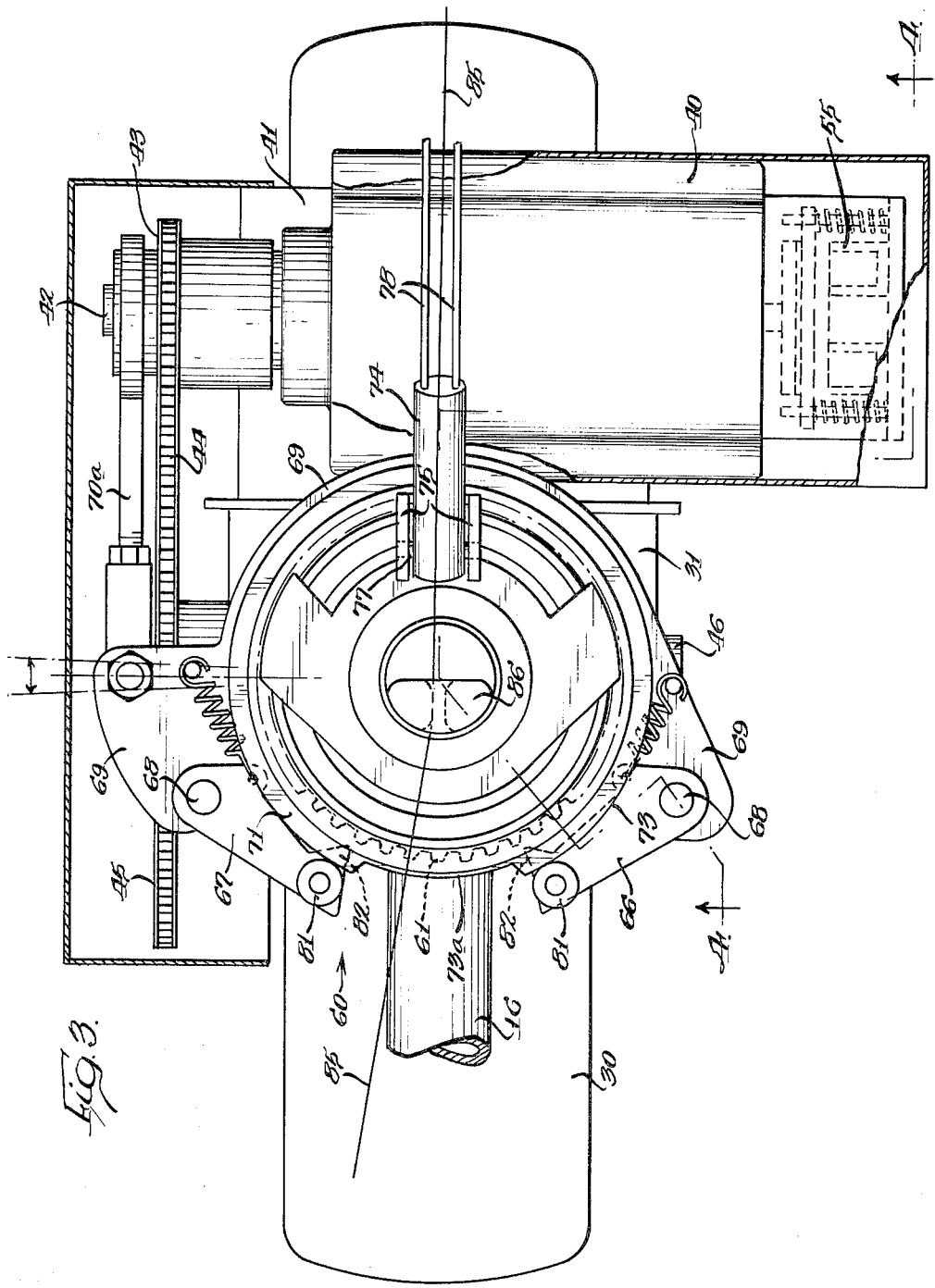
FIG. 3 is a fragmentary, enlarged plan view of a portion of the golf cart illustrated in FIG. 2.

In order to maintain the cart travelling in a straight forward direction, pawls 66 and 67 (FIGS. 3 and 4) are normally maintained out of engagement with ratchet wheel 61 by means of a cam member 71 mounted on a bearing 72 on journal tube 33 for free pivotal movement about the upright axis of the cart. Cam member 71 has a generally circular periphery 73 with a reduced portion or recess 73a generally concentric about the upright axis of the fork 31 and is maintained in this normal position whenever the cart is to move in a straight forward direction. A tubular guide 74 is mounted on cam member 71 for pivotal movement about a horizontal axis and is restrained against other movement with respect to cam member 71. More particularly, guide 74 is snugly received between vertical ears 75 of a bracket rigidly secured to a flange 76 extending upwardly from cam member 71, with a pivot pin 77 extending through these ears and the base of tubular guide 74. A resilient guide extension 78 is attached at its inner end to the outer end of tubular guide 74 and has an eye 80 at its outer end.

Thus, by turning guide 74 and guide extension 78 to either right or left from its normal head position, cam member 71 is pivoted about the upright axis of the fork so that one of a pair of cam contacting rollers 81, one on each ratchet pawl 66 and 67, moves off the circular cam periphery 73 and into recess 73a, thus engaging a respective pawl tooth 82 with teeth on ratchet wheel 61, and thereupon responsive to oscillation of carrier 69, fork 31 and front guiding wheel 30 are turned in the direction of the guide. The operation is such that with ratchet 61 stationary and a pawl engaged therewith, the pawl cannot drive the ratchet so the ratchet forces the fork 31 to turn due to oscillation of pawl carrier 69, and the pawl advances along the ratchet step by step until disengaged by cam 73.

Figure 2:
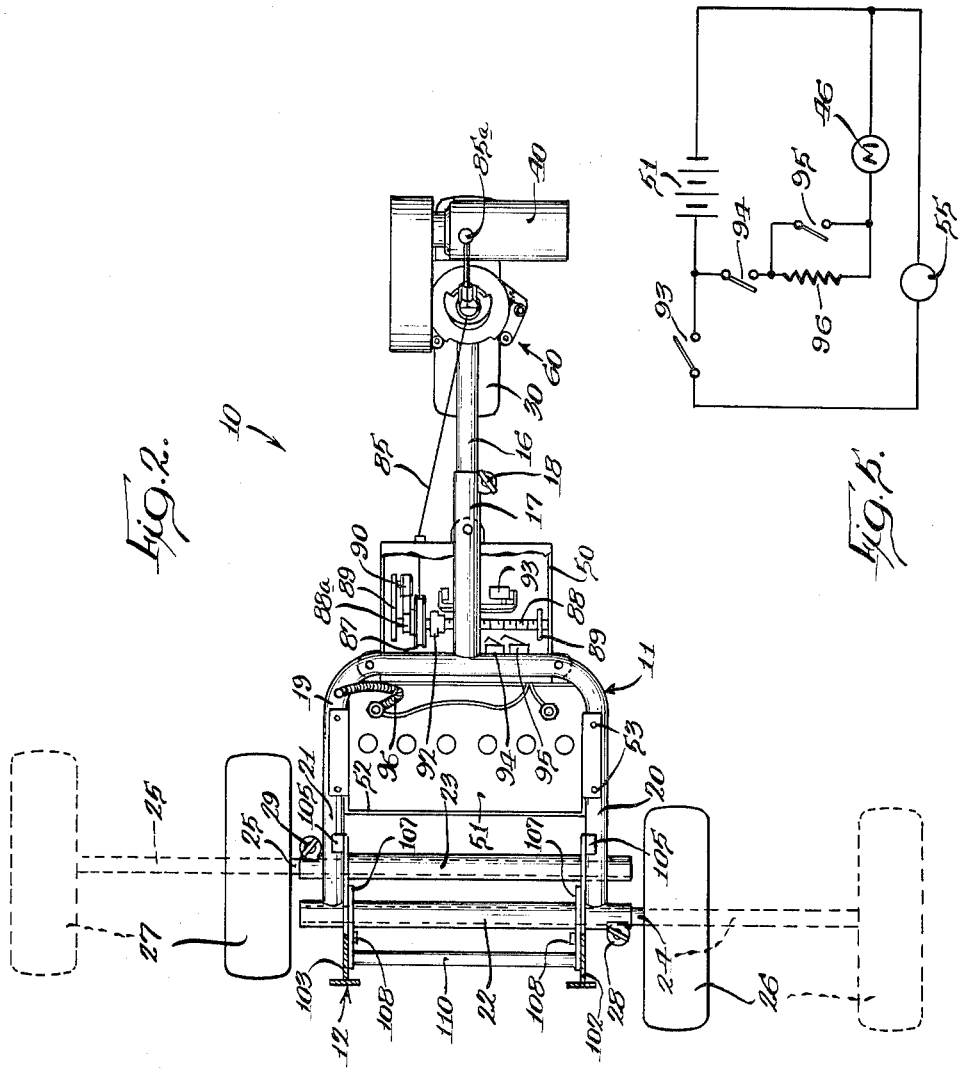
FIG. 2 is a plan view of the golf cart illustrated in FIG. 1.

Control means for operating the golf cart is provided in the form of a flexible line 85, such as a reliable string, extending through eye 80 and an aperture in a stationary guide 86 mounted on and extending upwardly from plug 38, with the string secured to and wound on a suitable reel 87 (FIG. 2) in control box 50. Reel 87 is secured on a shaft 88 journalled in suitable brackets 89 along either side of the box. Suitable resilient means is provided for rotating reel 87 and its shaft to wind line 85 thereon, and herein this means is exemplified in the form of a conventional leaf spring 88a having opposite ends coiled with inner coil portions secured, respectively, to shaft 88 and a rotatably mounted anchor drum 90 along the rear of the control box. A suitable spring is sold under the trade name "Negator." As the line 85 is pulled longitudinally outwardly through the guide 86, the reel 87 is rotated to wind spring 88a (for returning the reel upon release of tension on line 85).

An actuating nut 92, here in the form of a suitable plastic block, is threaded on shaft 88 and retained against rotation by engagement with a wall of control box 50 to move longitudinally of the shaft for engaging and operating actuators of three switches 93, 94 and 95. Switch 93 is connected in circuit with brake 55 and is closed by nut 92 so that the normally applied brake is energized and released whereupon the front wheel is free to turn. As line 85 is pulled outwardly further, the reel continues to rotate and nut 92 continues to move to the left as viewed from the front of the cart, thus engaging and closing switch 94 which is in circuit with motor 40 and a resistance 96 mounted on battery 51, to operate motor 40 at a relatively slow starting speed. Further outward movement of line 85 causes nut 92 to continue to move to the left engaging and closing switch 95 in circuit with battery 51 and the motor, dropping the resistance out of the circuit so that the motor operates at a normally relatively fast speed. Thus, the brake is initially released and thereafter the motor is energized to first move the cart at relatively slow starting speed and then at a faster normal speed. When the line is released the cycle is reversed so that the cart comes to a gradual stop with the brake applied to hold the cart in position.

A free end of line 85 may be provided with suitable means such as knob of button 85a or other handle to be grasped by the player as he walks along the course. Knob 85a limits return of the line upon contact with arm 74 at eye 80. The reel, actuating nut, and switches are so assembled that with the line fully wound on the reel, upon pulling the line out from the reel about two feet, switch 93 is closed to release brake 55; upon pulling the line out another foot, for a total of three feet, switch 94 is closed to start the motor 40 with resistance 96 in circuit so that the cart moves at a relatively slow speed; and upon pulling the line out a total of four feet from its normal reeled-in position, switch 95 is closed to drop resistant 96 out of the motor circuit and operate the cart at relatively fast speed.

As the player changes his direction of walking along the course, line 85 is pulled to a corresponding side of the cart, thus turning guide 74 and extension 78 in a direction towards the player and thereby actuating the power steering means to turn cart 31 and more particularly front guiding wheel 30 in a direction toward the player.

Golf bag holder 12 (FIGS. 1 and 2) is releasably mounted on outer tubular member 22 for pivotal movement about a horizontal axis between a forwardly inclined first position overlying chassis 11 to weight front wheel 30 during self-propelled remote control operation of the cart, and a rearwardly inclined second position extending outwardly from the chassis and counter-balancing the weight of the chassis and tending to lift front wheel 30 off the ground for manually moving the cart.

More particularly, holder 12 includes a generally U-shaped support 100 having an arcuate bight portion 101 providing means for grasping the cart in manual handling position. Lower end of opposed legs of the support are attached to mounting brackets 102 and 103. Each bracket has a generally V-shaped bottom portion 104, each with a pair of stops, including a first stop 105 which is seated against the upper face of respective leg 20 or 21 when the shoulder is in inclined position and a second stop 106 seated against a lower side of the respective leg 20 or 21 when the holder is in rearwardly inclined position. Keepers 107 are each pivotally mounted, one on each bracket 102 and 103, by respective pivot pins 108, and each has a hook portion 109 cooperating with the crotch of the V for receiving tubular member 22 inwardly of legs 20 and 21. These keepers are rigidly interconnected by a bar 110 for simultaneously pivoting the keepers between a closed position holding tubular member in the crotch and an open position for removal of the holder from the chassis. Means for supporting the bottom of golf bag 13 is provided by a generally rectangular cup-shape socket 112 mounted on brackets 102 and 103 and positioned so that golf bag 13 is between chassis 11 and bag support 100. The upper end of the bag is suitably releasably attached to the support as by a band 113 secured to upper portions of the support legs and receiving the bag, with a flexible strap 114 extending about the bag and suitably secured to the strap at one end and releasably buckled to the strap at the other end. During power use of the device, holder support 100 may overlie the bag and protect the bag against articles dropping on it. In manual handling of the device, the bag and holder may be inclined outwardly from the chassis and releasably held in the rearwardly inclined manual handling position as indicated in phantom in FIG. 1, with support 100 under the bag, thus protecting the bag against rubbing on steps or other surfaces as it is pulled in a rearward direction. It should be noted that in manual handling position with a person grasping grip portion 101 of the holder, it is a simple matter to apply slight downward pressure, with stops 106 engaged, and lift wheel 30 off the ground while moving the cart. And when releasing the grip portion wheel 30 is seated on the ground with the brake applied to prevent the cart from rolling.

It will be understood that a remarkably improved cart has been provided, one which will follow the golfer around the golf course with a minimum of effort on the part of the golfer in the form of a pull on the control string 85 and its knob 85a which need be only very light, as little as one half ounce, for purposes of controlling propulsion of the cart as well as guiding. Variable speeds are provided so that the rate of the cart will conform with variable speeds of the golfer and the cart is adapted to adequately climb hills. The brake mechanism will resist runaway of the cart while standing or travelling on a downhill grade. The cart is readily convertible from a mode of power operation to completely manual manipulation. It is collapsible to reduce the over-all size from a stable operating condition to a compact storage condition and is readily disassemblable when desired.

I claim:

1. A golf cart comprising: a carriage having wheel means for movement across the ground and means for supporting golf clubs; drive means for propelling said carriage across the ground including a normally idle motor means drivingly connected with said wheel means; a brake normally resisting wheel rotation; and control means, including a flexible line normally reeled in on said carriage and means mounting said line in a manually accessible position, for operating said motor means and releasing said brake responsive to pulling the line outwardly from said carriage, so that the car is propelled to follow a golfer pulling on the line.

2. A golf cart comprising: a carriage having wheel means for movement across the ground; drive means for propelling said carriage across the ground and including a normally idle motor means drivingly connected with said wheel means, and power supply means for operating said motor means; control means including a flexible line for controlling operation of said motor means, a spring biased reel on the carriage normally maintaining the line reeled in with a free end adapted to be grasped for pulling the line outwardly from said carriage, means responsive to positioning said line by its free end in a first position displaced outwardly from said normal position for operating said control means to connect said motor means and power supply means in circuit for operating the motor means at relatively slow speed, and means responsive to positioning said line in a second position displaced outwardly from said first position for controlling said control means to operate the motor means at relatively fast speed.

3. A golf cart comprising: a carriage including a chassis having a frame with opposite ends, a wheel rotatably mounted on one of said ends, and wheel means mounted on the other of said ends; drive means for propelling said carriage and including a normally idle electric motor operatively fixedly mounted on said one end to weight said one end, and drivingly connected with said wheel, and power supply means mounted on said carriage adjacent said one end for operating said motor and including battery means on said frame, a brake operatively mounted on said one end and normally holding said wheel against rotation; and control means for operating said motor and brake and including a flexible line normally reeled in on said carriage and having a free end adapted to be grasped for pulling the line outwardly from said carriage, means responsive to positioning said line in a first position displaced outwardly from normal position for releasing said brake to permit rotation of said wheel, means responsive to positioning said line in a second position displaced outwardly from said first position for connecting said motor and battery in circuit with a resistance and operating the motor at relatively slow starting speed, and means responsive to positioning said line in a third position displaced outwardly from said second position for droppng said resistance out of said circuit to operate the motor at relatively fast normal speed.

4. A golf cart comprising: a carriage for carrying golf clubs and having a chassis with opposite ends, a fork depending from one of said ends and journalled thereon for pivotal movement about a generally upright axis, guiding wheel means rotatably mounted on said fork, and wheel means mounted on the other of said ends; power steering means for guiding said carriage in either direction from center and including a ratchet wheel operatively fixedly mounted on said one end, a pawl carrier mounted for oscillating movement on said carriage, drive means including a motor mounted on said fork weighing said one end and having a drive shaft with an eccentric connected for oscillating said carrier, a pair of ratchet pawls normally out of engagement with said ratchet wheel and extending in opposite directions and mounted on said carrier for independent selective movement into and out of operative engagement with said ratchet wheel for indexing movement relative thereto to turn said fork and guiding wheel means relative to said chassis, one pawl operative to turn said fork and guiding wheel means in one direction and the other pawl operative to turn said fork and guiding wheel means in an opposite direction, means including a cam member operatively associated with said pawls and mounted at said front end for free pivotal movement about the upright axis of said fork from a normal position retaining said pawls out of engagement with said ratchet wheel, and means including said cam member and pawls for selectively engaging each pawl with said ratchet wheel responsive to pivot movement of said cam member in opposite directions from said normal position; and control means including an arm pivotable on the cam member about a horizontal axis, a line on said carriage, and extensible relative thereto, and having a free end empaling the end of said arm to pivot said cam member for guiding the carriage in the direction of movement of the free end of the line, and means responsive to extending said line for controlling speed of said motor.

5. A golf club cart comprising: a carriage including a chassis having a frame with front and rear ends adjustably connected for movement toward and away from each other, front wheel means carried on a mount journalled on said front end for pivotal movement about a generally upright axis, opposed rear wheels mounted on said rear end for movement toward and away from each other, a generally upwardly extending golf club support, means releasably securing a lower portion of said support to said rear end for pivotal movement between a forward position overlying said front end and a rearward position extending rearwardly from said chassis, and for releasably holding said support in said positions, and means on said support for manually moving the carriage when said support is in said rearward position; drive means for propelling said carriage and including a normally idle motor mount on said mount and drivingly connected with said front wheel, power supply means mounted on said carriage for operating said motor; a brake mounted on said mount and normally holding said front wheel against rotation; sequentially operable means for initially releasing said brake and operating said motor at relatively slow speed and thereafter operating said motor at relatively fast speed; means for guiding said carriage and including power steering means mounted on said mount for turning said front wheel and mount; and control means including a flexible line in normal position reeled-in on said carriage and having a free end for pulling the line outwardly from said carriage and subsequently operating said sequentially operable means responsive to progressively pulling said line from said normal position, and for operating said power steering means to retain said front wheel straight when said line extends directly forwardly from said carriage and when said line is pulled to either side of said carriage to turn said front wheel in the direction of said free end.

6. A golf club cart comprising: a carriage having a frame with front and rear ends connected for movement between compact and expanded operative positions, a front wheel vertically mounted on said front end for movement about a generally upright axis, rear wheels mounted on said rear end for movement between compact and expanded operative positions, a golf club support releasably secured to said read end for movement between a forward position overlying said front end and a rearward position extending rearwardly from said frame; normally idle motor means drivingly connected with said front wheel for propelling said carriage; a brake normally holding said front wheel against rotation; means for releasing said brake and actuating said motor; operable power steering means for turning said front wheel; a flexible line normally reeled-in on said carriage and having a free end for pulling the line outwardly of said carriage; means mounting said line in a manually accessible position; and control means responsive to pulling said line for operating said brake releasing and motor actuating means and control means responsive to pulling said line for operating said power steering means.

7. A golf cart comprising: a carriage including a chassis, operable between compact and expanded operative positions and having wheel means, an elongated golf club support on an incline overlying said chassis and having an upper end and a lower end, and means at the lower end of said support pivotally mounting said support on said chassis for pivotal movement between the inclined position overlying said chassis with the upper end inclined toward the leading end of the carriage and a second inclined position over-center from the first inclined position extending outwardly from said chassis with the upper end inclined rearwardly of the trailing end of the carriage.

8. A golf bag cart comprising: a carriage including a chassis having a frame with front and rear ends, means adjustably connecting said front and read ends for movement toward and away from each other between compact and extended operative positions, respectively, and for holding said ends in said positions, a fork depending from said front end and journalled thereon for pivotal movement about a generally upright axis, a front wheel operatively mounted for rotation on said fork, a pair of parallel rear wheels, means operatively mounting said rear wheels for rotation on said rear end and for movement toward and away from each other between compact and extended operatively position, respectively, and for holding said wheels in said positions to vary the tread thereof, a golf bag holder comprising a generally upwardly extending support, means releasably securing a lower end of said support to the rear end of said frame for pivotal movement about a generally horizontal axis between an inclined forward position overlying said frame front end and an inclined rearward position extending rearwardly from said frame, and for releasably holding said support in said positions, and means for releasably mounting a golf bag on said holder with said bag underlying said holder in said forward position and overlying said holder in said rearward position; and means at an upper portion of said support for manually moving the carriage when said support is in rearward position.

9. A golf bag cart comprising: a chassis having supporting means for movement across the ground, a generally upwardly extending golf bag support, means pivotally securing a lower end of said support to said chassis for movement between an inclined first position overlying said chassis with the upper end inclined toward the leading end of the cart and an inclined second position extending outwardly from said chassis and over-center from said first position with the upper end of the support inclined rearwardly of the trailing end of the cart, and means stopping said support in each of said positions.

10. The cart of claim 9 and means for releasably mounting a golf bag on said support with said bag underlying said support in first position and overlying said support in second position.

11. The cart of claim 9 and handle means at an upper portion of said support for manually moving and guiding the chassis when said support is in second position.

12. A golf cart comprising: a chassis for supporting golf clubs; normally idle drive means for propelling said carriage; operating means for controlling operation of said drive means; operable steering means for guiding said carriage; a flexible line normally reeled-in on said carriage and having a free end for pulling and unreeling the line relative to said carriage; means mounting said free end in a manually accessible position, control means responsive to pulling and unreeling said line for controlling operation of said operating means and control means responsive to pulling said line for controlling operation of said steering means.

13. A golf cart or the like comprising: a carriage having wheels movable across the ground, a support on the carriage mounting at least one wheel for turning movement to guide the carriage, means connected for driving at least one of said wheels to propel said carriage across the ground, a flexible line, resilient means mounting said line by one end on the carriage, said line having a free end including a manually accessible handle element supported by the line for pulling the free end of the line and extending the line from the line mounting means relative to the carriage, means responsive to extension and retraction of the line for controlling the drive means to start and stop propulsion, power steering means on the carriage including a source of power and means for connecting the source to turn the guide wheel support, a control member angularly movable in either direction from a center position under impulse of only a slight force for energizing and deenergizing the power steering means, means responsive to movement of said control member for turning said support in the corresponding direction from center, and means connecting the line to the control member for operating the control member by said line so that a pull on the line angularly relative to the carriage operates the control member for steering the carriage in the direction of the pull.

14. A golf club cart comprising: a carriage including a chassis, operable between compact and expanded operative positions and having wheel means, a golf club support, means mounting said support on said chassis for movement between a position overlying said chassis and a position extending outwardly from said chassis, normally idle drive means connected with said wheel means for propelling said carriage, operating means for controlling operation of said drive means, operable power steering means for guiding said carriage, a flexible line normally reeled-in on said carriage and having a free end with a handle element supported by the string at the free end for pulling the line outwardly from said carriage, and control means for controlling operation of said operating means responsive to pulling said line, and control means for operating said steering means responsive to pulling said line.

15. A golf cart for moving over the ground comprising: a carriage including a chassis having a frame with front and rear ends, means adjustably connecting said front and rear ends for movement toward and away from each other between compact and extended operative positions, respectively, a wheel mounting member depending from said front end and journalled thereon for pivotal movement about a generally upright axis, a front wheel operatively mounted for rotation on said mounting member, a pair of opposed parallel rear wheels, means operatively mounting said rear wheels for rotation on said rear end and for movement transverse to the frame between compact and extended operable positions with the axes of said rear wheels always parallel to the ground, a golf club support, and means securing said support to said frame.

16. A golf cart comprising a carriage including a chassis operable between compact and expanded operative positions and having wheel means including a drive wheel, a golf club support for supporting golf clubs on said chassis with said chassis in either of said positions, normally idle drive means connected with said drive wheel for propelling said carriage under normal terrain conditions with said chassis in either position, power steering means for guiding said carriage under normal terrain conditions with said chassis in either position, control means including a flexible line reeled in on said carriage and having a free end and means mounting said line with said free end manually accessible for pulling the line outwardly and angularly from said carriage for operating said drive means and power steering means, and manually grippable manual steering means for raising said drive wheel from the ground for manually moving and for manually steering the carriage up and down steep inclines in terrain.

17. In a golf cart, a carriage having a front end and having wheels for moving the carriage across the ground in a straight ahead direction, front end first, and including means mounting at least one wheel for turning movement in either direction from straight ahead to guide the movement of the carriage to the right or left, power steering means connected to the guide wheel for turning the guide wheel on either side of straight ahead direction, a flexible line on said carriage movable toward either side of the straight ahead direction, and means controlling said power steering means responsive to movement of the line to each side from straight ahead for turning said guide wheel toward the corresponding side.

18. In a golf cart, a carriage having wheels movable across the ground, a support on the carriage mounting at least one wheel for turning movement in either direction away from straight ahead direction of the carriage to guide the movement of the carriage to the right or left from straight ahead, a source of power on the carriage, means connecting the source of power to the drive wheel support for driving the guide wheel support and guide wheel through said turning movement, a control member substantially freely movable in either direction away from straight ahead on the carriage under impulse of only a light force for controlling said connecting means to connect the source of power for driving said guide wheel support and wheel to one side from straight ahead direction responsive to movement of said control member to the corresponding side from straight ahead, and a flexible string for moving the control member, said string having a handle element supported thereby for pulling the string to steer the carriage.

References Cited by the Examiner

UNITED STATES PATENTS

| | | | |
|---|---|---|---|
| 1,267,742 | 5/1918 | Bulley | 180—14 |
| 1,376,271 | 4/1921 | Gouge | 180—79.1 |
| 1,484,312 | 2/1924 | Washburn | 180—79 |
| 2,232,165 | 2/1941 | Cochran | 180—79.1 |
| 2,327,583 | 8/1943 | Framheim | 180—19 X |
| 2,405,674 | 8/1946 | Schliwa et al. | 280—34 |
| 2,425,688 | 8/1947 | Schulte. | |
| 2,662,776 | 12/1953 | Hurst | 280—34 |
| 2,812,211 | 11/1957 | Gardner | 280—47.34 X |
| 2,812,824 | 11/1957 | Adams | 180—19 |
| 2,879,858 | 3/1959 | Thomas | 180—19 |
| 2,937,706 | 5/1960 | Chandler | 180—19 |
| 2,962,106 | 11/1960 | Burnside et al. | 180—19 |
| 3,043,389 | 9/1962 | Steinberg. | |
| 3,150,735 | 9/1964 | Kaufman | 180—19 |
| 3,150,736 | 9/1964 | Kaufman. | |

FOREIGN PATENTS

| | | |
|---|---|---|
| 680,052 | 10/1952 | Great Britain. |

BENJAMIN HERSH, *Primary Examiner.*

A. HARRY LEVY, *Examiner.*